Wheel drive 2nd speed

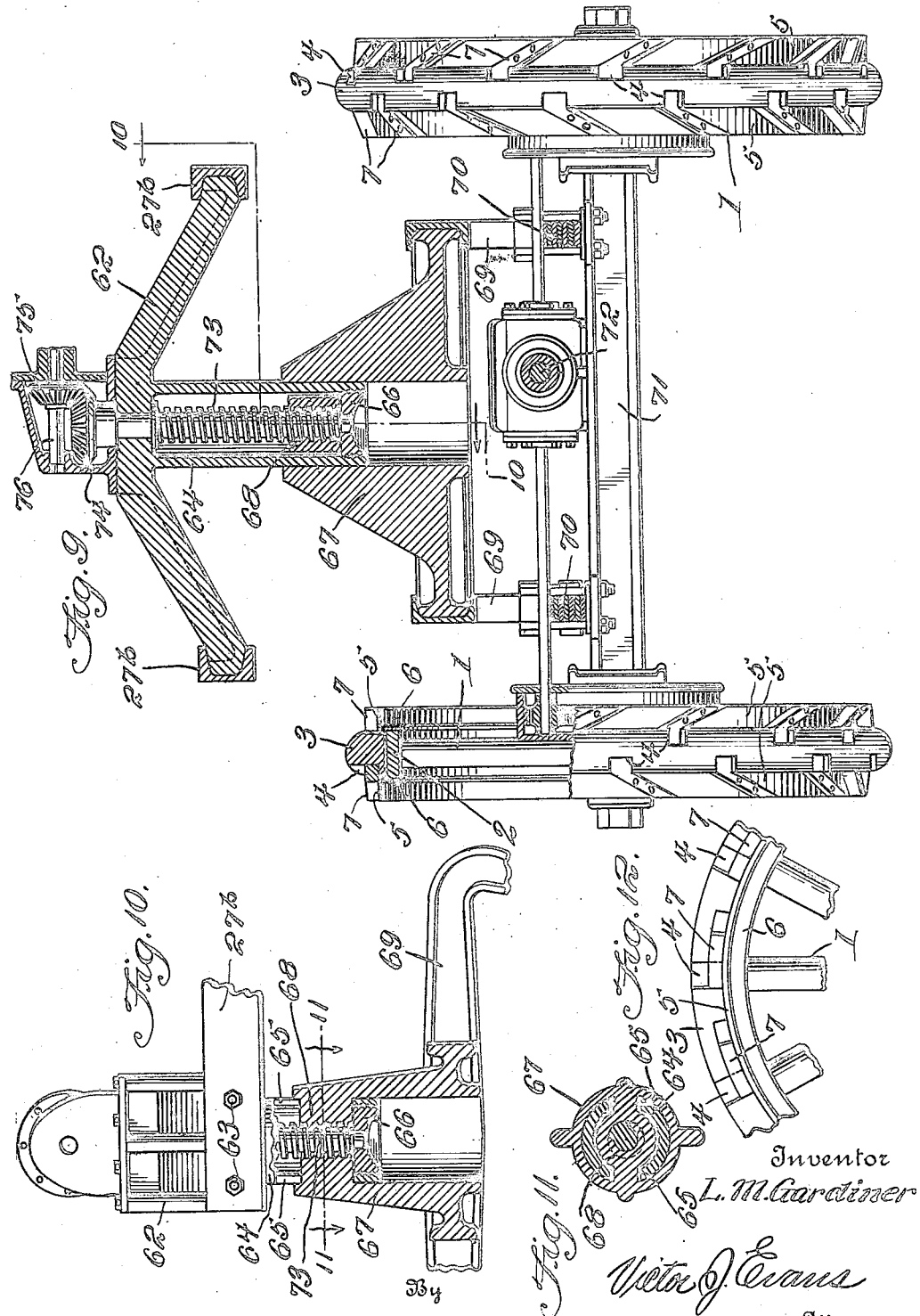

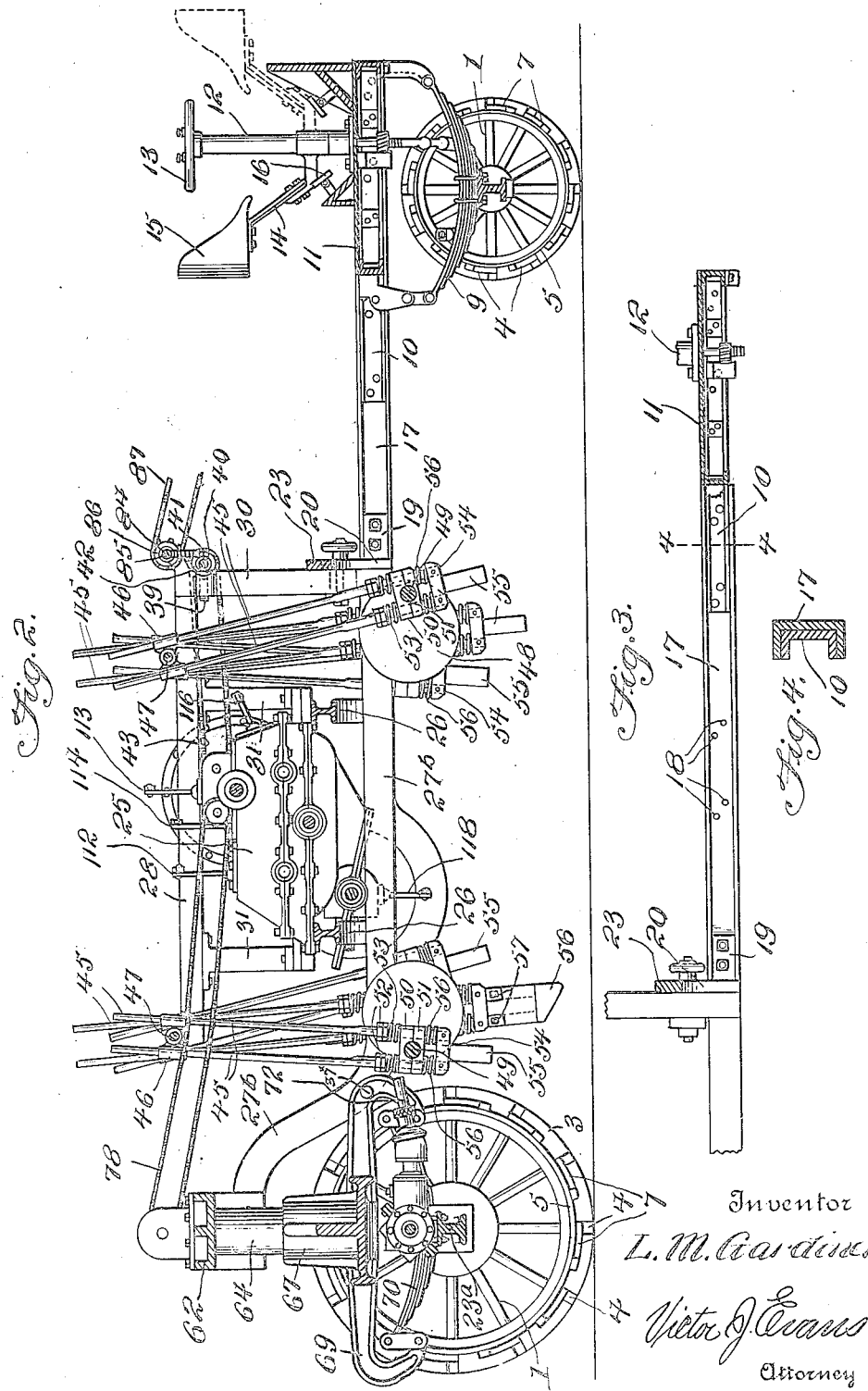

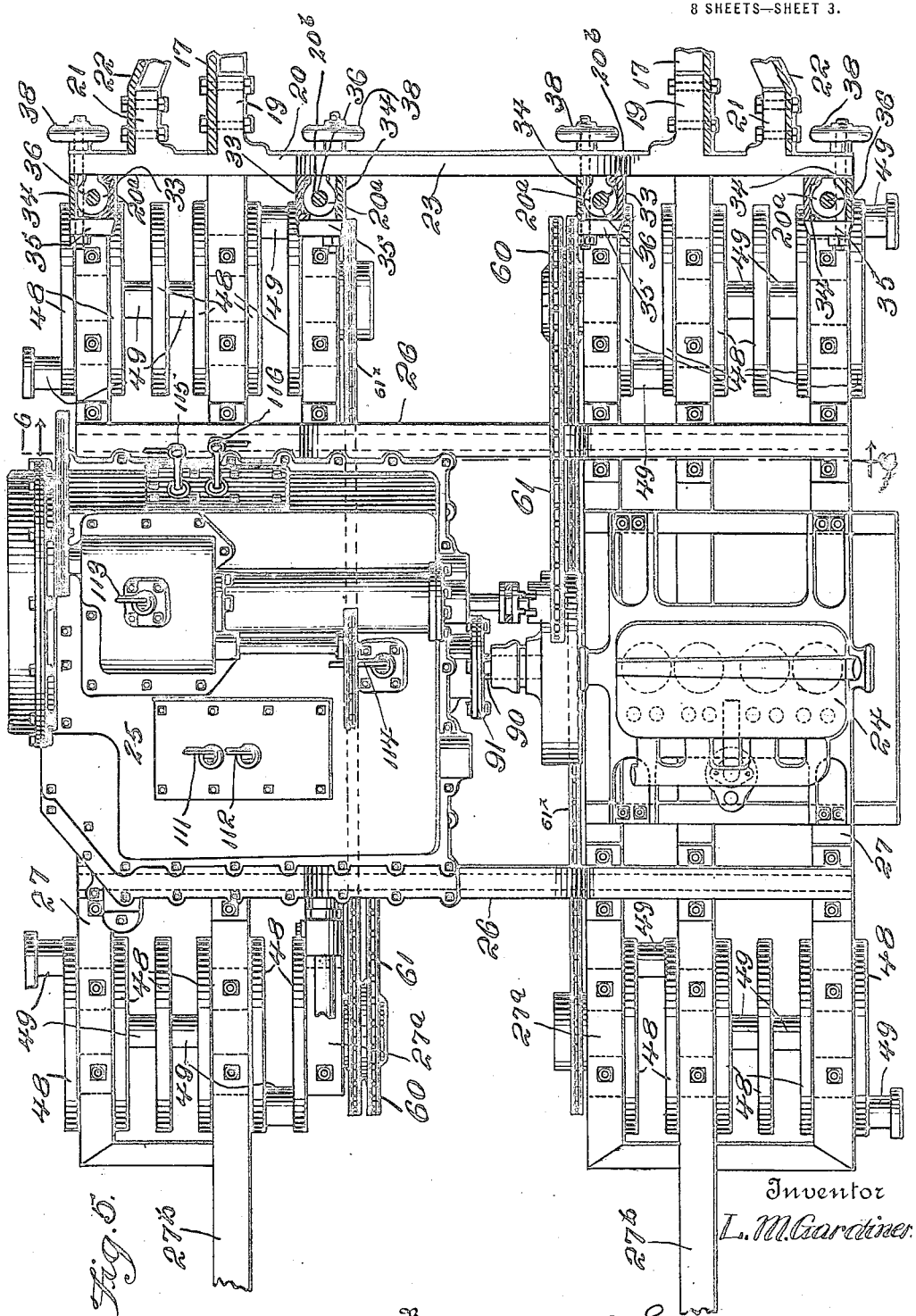

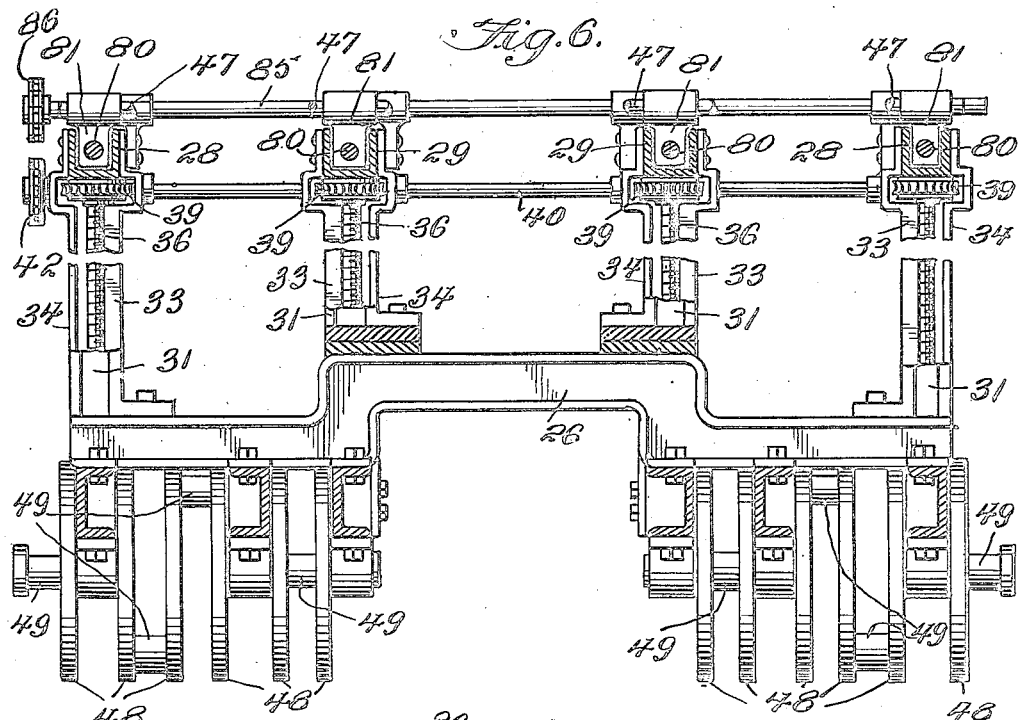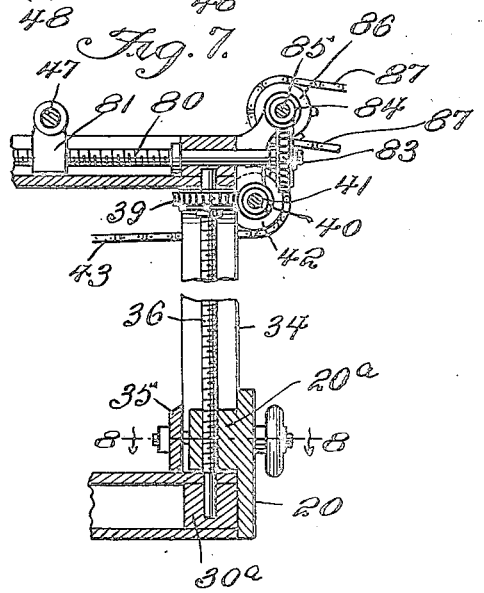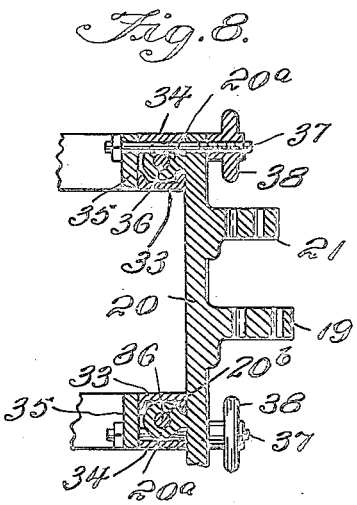

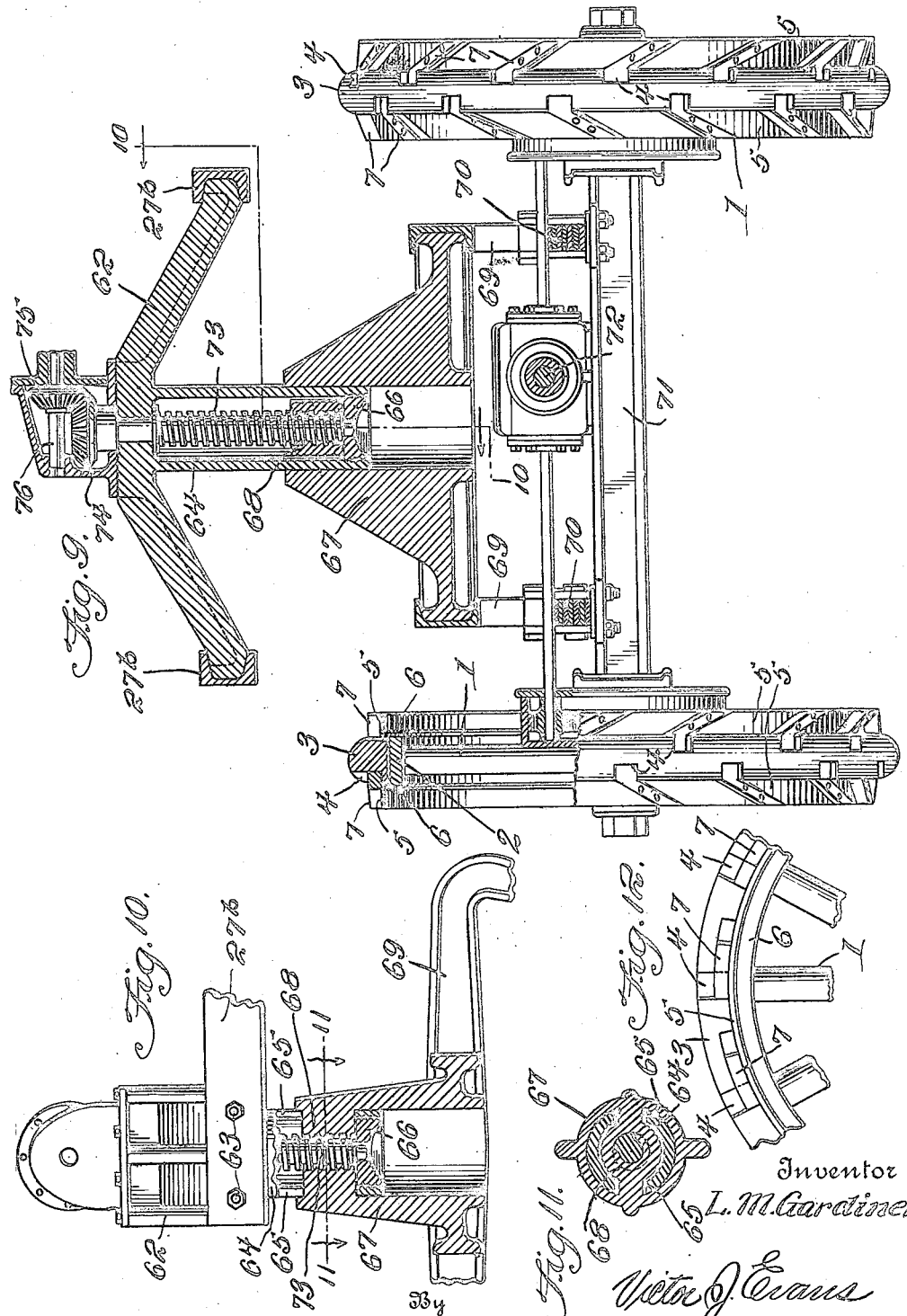

Wheel drive high speed

L. M. GARDINER.
TRACTOR.
APPLICATION FILED APR. 15, 1920.
1,422,558.
Patented July 11, 1922.
8 SHEETS—SHEET 7.
Fig. 17.
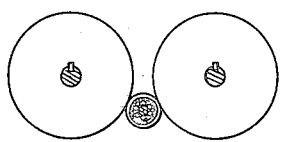
Fig. 22.
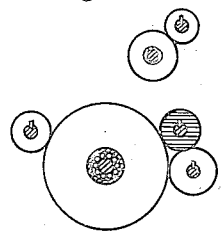
Fig. 18.
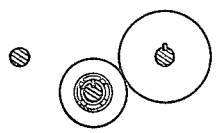
Fig. 23.
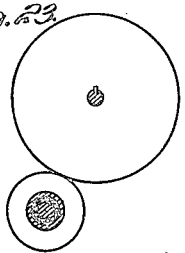
Wheel drive low speed
Fig. 19.
Fig. 26.
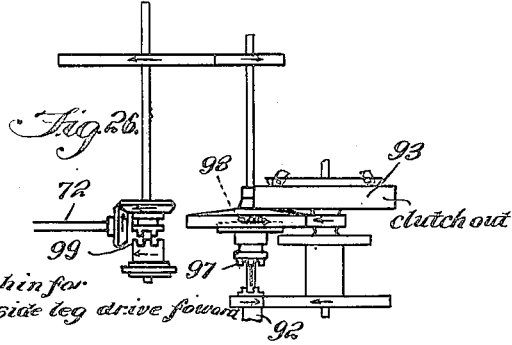
Throw clutch in for right side leg drive foward
clutch out
Fig. 20.
Wheel drive reverse
Fig. 21.
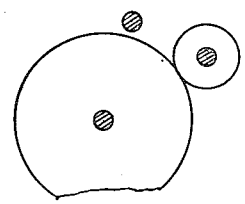
Fig. 27.
Throw clutch in for right side leg drive reverse
Inventor
L. M. Gardiner
By Victor J. Evans
Attorney

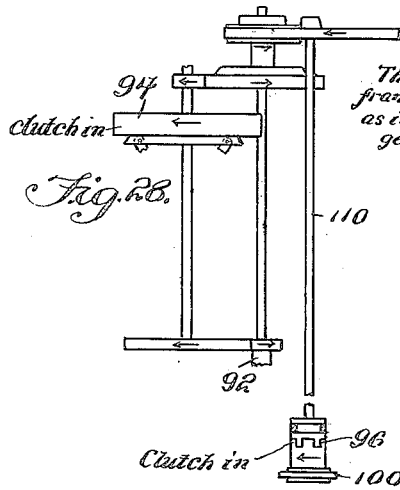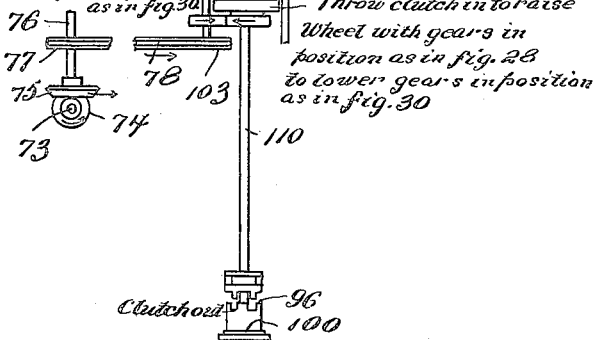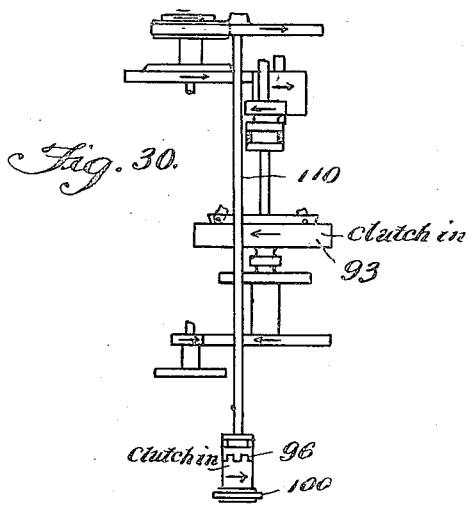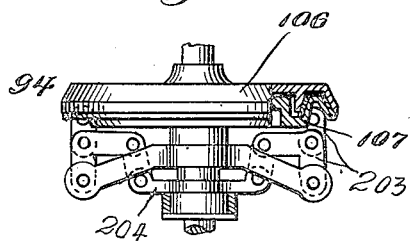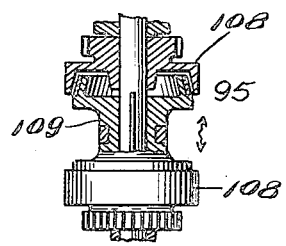

UNITED STATES PATENT OFFICE.

LOU M. GARDINER, OF PITTSBURGH, PENNSYLVANIA, ASSIGNOR TO THE IRON HORSE TRACTOR CO., OF PITTSBURGH, PENNSYLVANIA, A CORPORATION OF PENNSYLVANIA.

TRACTOR.

1,422,558.       Specification of Letters Patent.     Patented July 11, 1922.

Application filed April 15, 1920. Serial No. 374,185.

*To all whom it may concern:*

Be it known that I, Lou M. Gardiner, a citizen of the United States, residing at Pittsburgh, in the county of Allegheny and State of Pennsylvania, have invented new and useful Improvements in Tractors, of which the following is a specification.

One object of my present invention is the provision of a tractor for agricultural uses and possessed of a wide range of utility.

Another object is the provision in a tractor of improved and highly advantageous ground penetrating means.

Another object is the provision of an improved and highly efficient transmission gearing designed more particularly for use in the tractor but capable of employment to advantage in various other connections.

To the attainment of the foregoing the invention consists in the improvement as hereinafter described and definitely claimed.

In the accompanying drawings, hereby made a part hereof:—

Figure 1 is a top plan view of a tractor constructed in accordance with my invention.

Figure 2 is a longitudinal vertical section of the tractor, taken on the line 2—2 of Figure 1.

Figures 3 and 4 are detail views of parts of the tractor frame, Figure 4 being an enlarged section on the line 4—4 of Figure 3.

Figure 5 is an enlarged, detail plan view illustrative of the relative arrangement of the motor and the transmission gearing on the sub-frame.

Figure 6 is a transverse, broken vertical section showing a portion of the sub-frame of the tractor and the means for adjusting the sub-frame vertically and adjustably fixing the same with respect to the remainder of the frame, said view taken on the line 6—6 of Figure 5.

Figure 7 is a detail vertical section of the same.

Figure 8 is a horizontal detail section taken in the plane indicated by the line 8—8 of Figure 7, looking downwardly.

Figure 9 is an enlarged detail view, partly in elevation and partly in transverse section, and showing the means for adjusting the rear portion of the sub-frame vertically and for adjustably fixing the same.

Figure 10 is a view taken on the line 10—10 of Figure 9, looking toward the left.

Figure 11 is a detail horizontal section taken on the line 11—11 of Figure 10, looking downwardly.

Figure 12 is a detail side elevation of a portion of one of the ground wheels.

Figure 13 is a detail enlarged horizontal section showing the arrangement of one of the ground penetrating implements relatively to the shank by which it is carried, said view being taken on the line 13—13 of Figure 14.

Figure 14 is a view, partly in elevation and partly in section, of the same.

Figure 15 comprises disconnected views of the shank referred to for the ground penetrating implement.

Figure 16:
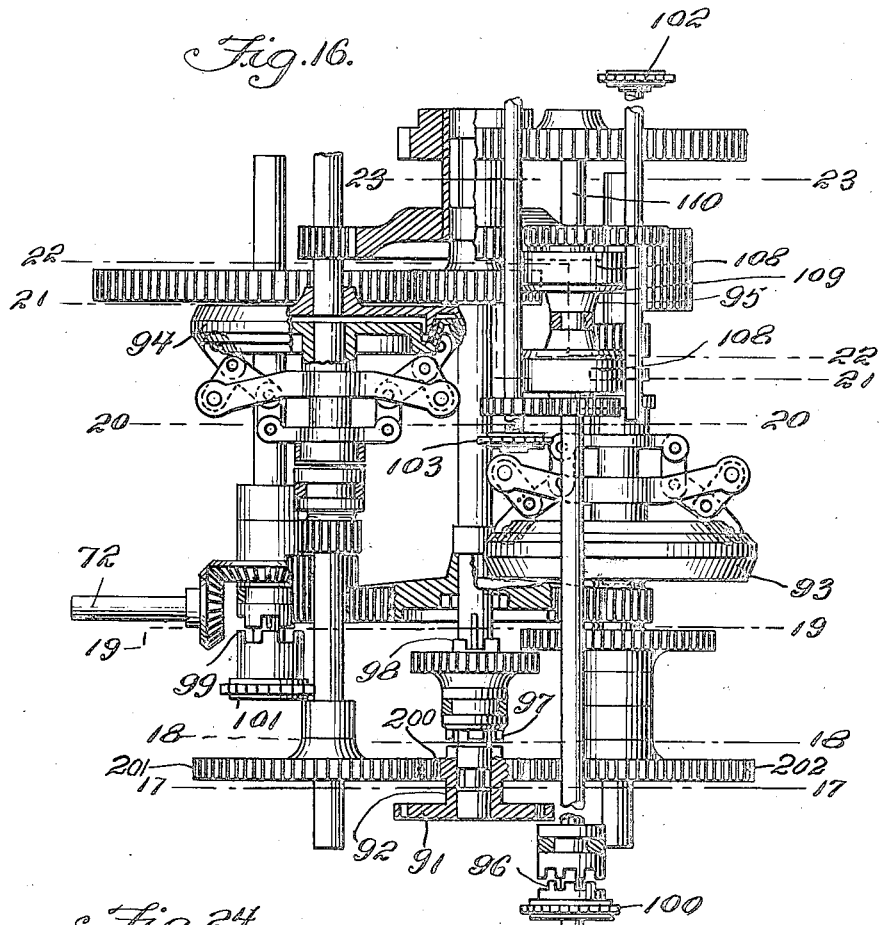

Figure 16 is an enlarged detail view, partly in plan and partly in section, showing my novel transmission gearing per se.

Figure 17 is a diagrammatic view having to do with the imparting of an exact understanding of the capabilities of the transmission gear, said figure being a section on the line 17—17 of Figure 16.

Figure 18 is a section for the same purpose on the line 18—18 of Figure 16.

Figure 19 is a section for the same purpose on the line 19—19 of Figure 16.

Figure 20 is a section for the same purpose on the line 20—20 of Figure 16.

Figure 21 is a section on the line 21—21 of Figure 16.

Figure 22 is a section on the line 22—22 of Figure 16.

Figure 23 is a section on the line 23—23 of Figure 16.

Figures 24 to 30 are views diagrammatic in character and accompanied by appropriate legends designed to assist in the understanding of the figures and the capacity of function of the transmission gearing.

Figure 31 is a detail view, partly in plan and partly in section, of one of the novel and advantageous friction clutches comprised in the transmission gearing.

Figure 32 is a detail view of the other friction clutch comprised in the transmission gearing.

Similar numerals of reference designate corresponding parts in all of the views of the drawings.

The ground wheels 1 of the tractor, four in number, are respectively characterized by a peculiar and advantageous construction such as is best shown in Figures 9 and 12. By particular reference to said figures it will be observed that each wheel includes a felly 2, a rubber tire 3 having staggered recesses 4 in its opposite sides, rim sections 5 of metal arranged at opposite sides of the tire 3 and having interior shallow flanges 6 disposed at opposite sides of the felly 2, and diagonal metallic cleats 7 arranged on and appropriately connected to the rim section 5 and also arranged with their inner ends in the recesses 4. By virtue of said construction it will be observed that when the tractor is traversing a hard surface the resilient tire 3 will bear on the surface, while when the tractor is traversing soft ground the tires 3 will sink into the ground whereupon the recesses 4 and the cleats 7 will promote the tractive capacity of the wheels. It will also be noted here that when the tractor is traversing a hard surface the recesses 4 in the tires 3 will tend to prevent skidding of the tractor.

Two of the ground wheels referred to are the steering wheels and are connected through the axle and springs 9 with auxiliary frame bars 10, Figures 2, 3, and 4, which bars 10 carry a platform 11 on which is a hollow post 12. A steering shaft extends through the said post 12 and is connected with the wheels at the right of Figure 2 and is equipped with a hand wheel 13. A seat support 14 carries a seat 15 and is revoluble about the post 12 so that the driver may face toward the right or toward the left end of Figure 2 as conditions require. It will also be observed by particular reference to the right of Figure 2 that the platform 11 carries foot pieces 16 for a purpose hereinafter set forth. The auxiliary bars 10 are of channel form and are designed to be arranged in longitudinal frame bars 17 of channel form as best shown in Figure 3. The longitudinal frame bars 17 are provided with several sets of bolt holes 18 as appears in Figure 3, and from this it follows that the bars 10 may be relatively arranged as shown in Figure 2 or may be relatively arranged as shown in Figure 3, the latter arrangement being preferable when it is desired to attach plows or other ground working devices to the frame bars 17 adjacent to the steering wheels.

By reference to Figure 5 it will be noted that the longitudinal frame bars 17 are fixedly connected at their inner ends to longitudinally disposed arms 19 on a transverse frame bar 20; also, that the bar 20 is provided with auxiliary arms 21 between which and the frame bars 17 braces 22 are interposed, Figures 1 and 5. The frame bar 20 is further provided at 20$^a$ with four integral lugs; the said lugs being disposed at the inner sides of the bar 20, Figures 7 and 8 and being provided with vertically disposed threaded bores 20$^b$.

The transverse frame bar 20 is arched at 23, and at the inner side of said bar 20 is arranged the vertically adjustable sub-frame of my improvement, which sub-frame has its center of movement at the axle 23$^a$, and serves to carry the motor 24, the casing 25 of the transmission gearing, the ground penetrating means, and the means for actuating the ground penetrating means as hereinafter definitely set forth. By particular reference to Figures 1, 2, 5 and 6, the vertically adjustable sub-frame alluded to will be understood as comprising transverse arched bars 26, lower side bars 27, lower intermediate longitudinal bars 27$^a$, rearwardly and upwardly extending longitudinal bars 27$^b$, upper side bars 28, of channel form in cross section, upper intermediate bars 29, of channel form in cross section, upright end members 30 (four in number), and upright intermediate bars 31 (eight in number). The upright members 30 are peculiar in construction but are also identical in construction, so that a detailed description of the upright member 30 shown in Figures 7 and 8 will suffice to impart a definite understanding of all. Therefore by comparison of Figures 7 and 8 it will be noticed first that each of the lower longitudinal bars of the sub-frame is provided at its outer end with a block 30$^a$. It will also be noticed that each upright member includes an upright flanged plate 33, an upright flat plate 34, and a clamping plate 35 arranged at right angles to the plates 33 and 34. Four upright screws 36 are arranged to bear in the forward portions of the lower longitudinal bars and the blocks 30$^a$ and are extended through the threaded bores in the lugs 20$^a$. Rotation of the said screws 36 about their axes will be attended by vertical movement of the sub-frame with respect to the main frame, and in order to adjustably fix the sub-frame at various heights with respect to the main frame I provide the four clamping provisions shown in Figure 5, each of the said clamping provisions including in combination with a clamping plate 35, a bolt 37 the outer portion of which is threaded and the inner portion of which is connected to the plate 35, and a hand nut 38 mounted on the said bolt and arranged at the outer side of and adapted to bear against the transverse frame bar 20. Manifestly tightening of the said clamping provisions will not only preclude casual movement of the sub-frame with respect to the main frame, but will take the pull and strain off the screws 36 incident to the operation of the tractor. Each of the screws 36 is provided at 39 with a worm gear, and intermeshed with the said worm gears 39 are worms 40 on a transverse shaft 41 carried by the sub-frame. At one end the shaft 41 is equipped with a sprocket gear 42 for the connection of a sprocket belt 43 through which the shaft 41 is rotated to vertically adjust the sub-frame. The vertical adjustment of the sub-frame described is for the positioning of the ground penetrating means of my invention and the means for actuating the said ground penetrating means. The ground penetrating means and the actuating means therefor are divided into two groups as is clearly brought out in Figure 1, and it will be noted that two of the said groups are located at one side of the longitudinal center of the tractor and the other two groups are arranged at the opposite side of the said longitudinal center. As will hereinafter appear this arrangement is highly desirable inasmuch as by driving the ground penetrating devices at one side of the longitudinal center in one direction and the ground penetrating devices at the opposite side of the longitudinal center in the opposite direction short turning of the tractor may be greatly facilitated. By comparison of Figures 1, 2, 5 and 6 it will be readily understood that each group of ground penetrating devices and the actuating means therefor includes rods 45 arranged in pairs and movable endwise through rocker heads 46 movable about transverse supporting shafts 47 on the upper portion of the sub-frame, crank disks 48 mounted at the lower portion of the sub-frame and having shaft portions 49, bearing sections 50 and 51 arranged at opposite sides of said shaft portions 49 and loosely receiving the rods 45, abutments 52, preferably adjustable nuts, mounted on the rods 45 above the bearing sections 50, springs 53 interposed between the abutments 52 and the bearing sections 50, and heads 54 connected to the lower ends of the rods 45 and having shanks 55, the said heads 54 being maintained in spaced relation to the bearing sections 51 by springs 56. Manifestly when the crank disks 48 are rotated the rods 45 and the shanks 55 will be moved downwardly and upwardly, and when the vertically adjustable sub-frame is in proper position the implements on the shank 55 will be powerfully moved into and out of the ground, the said operation being adapted to be used to advantage for traction purposes and also for ground working purposes, as will be readily apparent. I illustrate in Figures 2, 13, and 14 one of the implements 56 which may be employed on the shanks 55, each of the said implements 56 being adapted to be clamped on a shank 55 through the medium of bolts 57.

By virtue of the arching of the transverse bars of the sub-frame and the arrangement of the pairs of ground penetrating groups at opposite sides of the longitudinal center of the tractor, it will be manifest that the tractor is adapted to adequately straddle a row of plants incident to its traverse across a field. This capacity is also furthered by the arrangement of the transmission gear casing 25 at one side of the longitudinal center and the motor 24 at the opposite side of said center which arrangement also contributes to the balancing of the tractor.

By comparison of Figures 1 and 5 it will be understood that each set of cranks is equipped with a sprocket gear 60, and that drive chains 61 are interposed between the transmission gearing hereinafter described and the said sets of cranks.

The longitudinal upwardly extending bars 27[b] of the vertically adjustable sub-frame are of channel form in cross section, Figure 9. By comparison of Figures 9, 10 and 11 it will be noted first that a ribbed yoke 62 is arranged transversely between and is bolted at 63 to said bars 27[b], and it will also be noted that on the yoke 62 is a central pendent sleeve 64, slotted at diametrically opposite points as indicated by 65 in Figure 11. The lower end of the said sleeve 64 is interiorly threaded to receive a nut 66. The sleeve 64 is movable upwardly and downwardly in a bearing member 67 and the said bearing member is integral with a nut portion 68 that is arranged in the sleeve 64. The said bearing member 67 is mounted in and between longitudinal channel bars 69 which are connected through springs 70 with the axle 71 supported by two of the ground wheels 1 before described. As before indicated the mounting of the axle 71 in the ground wheels affords a center of movement for the vertical adjustment of the sub-frame before described.

I show in Figure 9 a shaft 72 through which motion is transmitted to the ground wheels just described for the purpose of propelling the tractor. The connection between the shaft 72 and the ground wheels referred to may be of the construction shown in Figure 9 or of any other construction compatible with the purpose of my invention.

My invention also contemplates the vertical adjustment of the portion of the sub-frame and of the entire frame of the tractor at the left hand end of Figure 2. Toward the said end the sleeve 64 is movable vertically in the bearing member 67, and a vertical screw 73 is engaged with the nut portion 68 of the bearing member 67. Manifestly when the screw 73 which bears in the yoke 62, is turned about its axis the yoke 62 will be raised or lowered according to the direction of rotation of the screw 73. At its upper end the screw 73 is provided with a miter gear 74 and said gear 74 is intermeshed with a gear 75, carried by a transverse shaft 76 which also carries a sprocket gear 77 to which is connected a sprocket belt 78 through the medium of which the shaft 76 is rotated for the vertical adjustment of the rear portion of the frame with respect to the bearing member 67.

At this point I would have it understood that it is within the purview of my invention to remove the bolts 63, Figure 10, and disassociate the yoke 62 and all of the parts connected therewith from the remainder of the tractor at which time the frame bars 27[b] at the left of Figures 1, 2 and 5 may be appropriately connected to a binder or any other agricultural machine, and the shaft 72 may be connected with the working parts of the binder or other machine for the actuation of the said parts.

I would also have it understood that it is contemplated by my invention to adjust the groups of ground penetrating devices longitudinally. Toward this end I provide in the upper longitudinal channel bars of the sub-frame longitudinal screws 80, and I also provide each of the transverse shafts 47 with nuts 81 through which extend oppositely threaded portions of the screws 80. At their forward ends the screws 80 are provided with worm gears 83, Figure 7, and intermeshed with the said worm gears 83 are worms 84 on a transverse shaft 85 which also carries a sprocket gear 86 for the connection of a sprocket belt 87, best shown in Figure 2. The said sprocket belt 87 is designed to extend to appropriate actuating means (not shown) located in close proximity to the driver's seat 15 so that whenever occasion demands the driver can by moving the sprocket belt 87 synchronously adjust the shafts 47 toward or away from each other and thereby change the pitch of the ground penetrating devices. While the sprocket belt 87 is manually actuated it is to be understood that the sprocket belt 43 and the sprocket belt 78 before described are driven by the motor 25 through the medium of the transmission gearing hereinafter set forth. It will be noted, however, at this point that either the sprocket belt 43 or the sprocket belt 78 may be actuated independently of the other.

I would further have it understood at this point that it is within the purview of my invention to remove the yoke 62 and all of the parts connected therewith from the remainder of the tractor and to then depend on the ground penetrating means to support one end of the tractor. This arrangement may be resorted to when it is desired to move the tractor through or over exceptionally soft ground.

It is also to be understood that when deemed expedient the auxiliary frame bars 10 and all of the parts connected therewith may be disassociated from the remainder of the tractor in which event any approved means may be employed to support the end of the tractor at the right hand of Figures 1 and 2, or if preferred at such time the said end of the tractor may be supported by the cooperation of the ground penetrating means with the ground.

It will be appreciated that the ground penetrating means herein is of the walking type and is adapted to serve efficiently for traction purposes as well as for ground working purposes. Manifestly when the sub-frame described is set sufficiently low the implements 56 have the capacity of penetrating the ground below the plow pan which is always desirable when the ground is broken up for purposes of cultivation.

The drive shaft of the motor 24 is numbered 90, and it is appropriately connected at 91, Figure 5, with a sleeve shaft 92 comprised in the transmission gearing; the said sleeve shaft 92 bearing spur gear teeth 200 intermeshed with spur gears 201 and 202 on shafts of the transmission as shown in Figure 16. In addition to the said sleeve shaft 92 the transmission gearing includes two reversely arranged friction clutches of the type shown in Figure 31, and a single friction clutch of the type shown in Figure 32. The first-named friction clutches are numbered 93 and 94, respectively, in Figure 16, and they are peculiar and advantageous in that their opposed members are locked in engagement with each other. The other friction clutch shown in detail in Figure 32 is numbered 95. In addition to the said friction clutches the transmission gearing includes positive clutches 96, 97, 98 and 99 as well as the necessary shafting and spur gears. To drive the wheels 1 at the left of Figures 1 and 2, the transmission gearing has the capacity of three speeds forward and one speed reverse. To drive the ground penetrating means, the transmission gearing has one speed and that a low speed. To drive the means to elevate or depress the sub-frame hereinbefore described in detail, the transmission gearing has one speed and that the low speed. In Figure 26 is shown the manner in which the elements of the transmission gearing are arranged to drive the drive wheels at low speed. The clutch 99 is thrown in with this arrangement to drive the right hand ground penetrating means forwardly. Figure 27 shows the arrangement of the transmission gearing elements when the drive wheels are reversed. In this arrangement, the clutch 99 is thrown in to drive the ground penetrating means at the right hand side of the longitudinal center reversely or rearwardly. In Figure 28 is shown the arrangement of the elements when the ground penetrating means at the left hand side of the tractor is to be driven forwardly. In Figure 29 is shown the arrangement and is made clear the manipulation for raising the sub-frame or to lower the same. In Figure 30 is shown the arrangement to reversely drive the ground penetrating means at the left hand side of the tractor. To simultaneously move in opposite directions the ground-penetrating means at opposite sides of the tractor, the clutch in Figure 26 is thrown in to actuate the ground-penetrating means at the right side forwardly, and at that time the parts are arranged as shown in Figure 30 to actuate the ground-penetrating means at the left side rearwardly, and vice versa; the arrangement shown in Figure 27 being resorted to to actuate the right-side ground-penetrating means rearwardly, and that shown in Figure 28 being resorted to to actuate the left side ground-penetrating means forwardly.

In addition to the elements thus far enumerated the transmission gearing includes a sprocket gear 100 for connection with the ground penetrating means at the left hand side of the tractor, a sprocket gear 101 to be connected with and drive the ground penetrating means at the right hand side of the tractor, a sprocket gear 102 for the connection to raise or lower the right hand end portion of the sub-frame, and the sprocket gear 103 for the connection to raise or lower the left hand end of the sub-frame. The transmission gearing also comprises the arrangement of shafts and spur gears illustrated and which will be understood by comparison of Figures 16 through 30 inclusive. By reference to Figures 16 and 31 it will be understood that each of the friction clutches 93 and 94 comprises a female clutch member 106, a laterally movable male clutch member 107, and connecting links 203 on the member 107. Two of the said links are connected to a laterally shiftable member 204. When the members 106 and 107 are in engagement, the connecting links 203 will rest in dead centers as shown in Figure 31 and manifestly it is necessary to break the said dead centers before the member 107 can be moved out of engagement with the member 106. The friction clutch 95 shown in Figures 16 and 32 is made up of female members 108 and a duplex male member 109 splined on the shaft 110. The manner in which the drive from the engine shaft is effected in Figures 28 to 30 will be understood when it is stated that the sleeve shaft 92 is connected with the engine as best shown in Figures 5 and 16.

Figure 24:
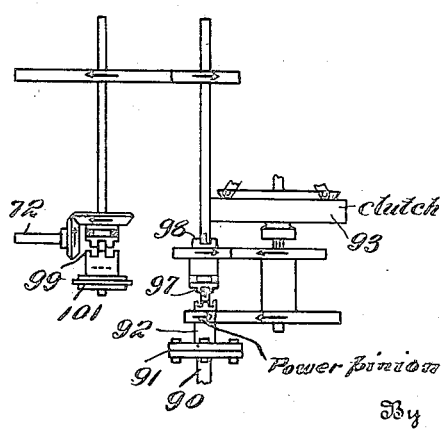
Figure 25:
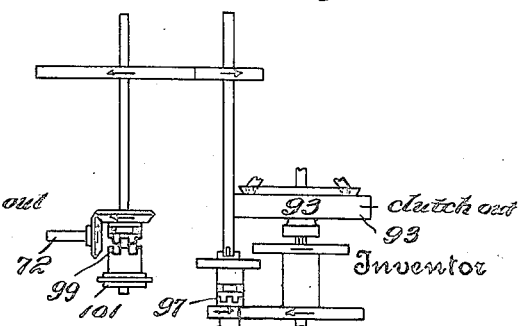

To drive the ground wheels at second speed the parts are relatively arranged as shown in Figure 24; to drive said wheels at high speed the parts are relatively arranged as shown in Figure 25; and to drive said wheels at low speed the parts are arranged as shown in Figure 26.

For the manipulation and control of the several clutches comprised in the transmission gearing I provide the manually operable connections 111, 112, 113, 114, 115, 116, 117 and 118 shown in Figures 1, 2 and 5. It will be apparent from the foregoing that through the medium of the manually operable connections described, the driver of the tractor is enabled to bring about propulsion of the tractor at three different speeds forwardly and of one speed reversely, and is also enabled to drive the ground penetrating means at one side of the longitudinal center of the tractor in one direction and to simultaneously drive the ground penetrating means at the opposite side of the longitudinal center in the opposite direction, and is further enabled to drive the elevating and depressing means at the ends of the sub-frame. It will also be apparent that the operator is enabled to drive the ground penetrating means at the low speed only, and that this is also true of the means to elevate and depress the sub-frame by which the ground penetrating means is carried.

At 37× in Figure 2 and Figure 1 I show transverse bolts whereby when deemed expedient the channel bars 69 may be fixed to the sub-frame bars 27ᵇ so that when the tractor is traveling over a hard surface all shock and jar as well as strain may be taken off the means for vertically adjusting the end of the sub-frame at the left of Figures 1 and 2.

It will be apparent by particular reference to Figure 5 that both groups of ground penetrating devices at each side of the longitudinal center of the tractor are capable of being driven from the transmission gearing, one pair of the drive belts hereinbefore referred to being numbered 61 and the other pair of drive belts being numbered 61×.

I have entered into detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention such changes or modifications may be made as fairly fall within the scope of my appended claims.

Having described my invention, what I claim and desire to secure by Letters-Patent, is:—

1. In a tractor, the combination of a frame, a vertically adjustable sub-frame associated with the frame, ground penetrating means carried by the sub-frame, and means also carried by the sub-frame to actuate the ground penetrating means; said actuating means comprising a motor and a transmission gearing with a connection to raise and lower the sub-frame and another connection to drive the ground penetrating means.

2. In a tractor, the combination of a frame, a vertically adjustable sub-frame associated with the frame, ground penetrating means carried by the sub-frame, and actuating means carried by the sub-frame and including transmission gearing having a connection to drive the ground penetrating means and a connection to adjust the sub-frame vertically.

3. In a tractor, the combination of a frame, a vertically adjustable sub-frame associated with the frame, ground penetrating means carried by the sub-frame, actuating means carried by the sub-frame and including transmission gearing having a connection to drive the ground penetrating means and a connection to adjust the sub-frame vertically, and means to fix the sub-frame to the frame and thereby remove strain from the sub-frame adjusting means.

4. In a tractor, the combination of a frame, a vertically adjustable sub-frame associated with the frame, ground penetrating means carried by the sub-frame, means also carried by the sub-frame to actuate the ground penetrating means, means also carried by the sub-frame to adjust the same vertically, and means to fix the sub-frame to the frame and thereby remove strain from the sub-frame adjusting means.

5. In a tractor, the combination of a frame, a vertically adjustable sub-frame associated with the frame, groups of ground penetrating means at opposite sides of the sub-frame, a motor at one side of the sub-frame, and transmission gearing operable by the motor and arranged at the opposite side of the said frame to the motor and having connections to operate the groups of ground penetrating means and also having a connection to adjust the sub-frame vertically.

6. In a tractor, the combination of a frame, a vertically adjustable sub-frame associated with the frame, groups of ground penetrating means at opposite sides of the sub-frame, a motor at one side of the sub-frame, and transmission gearing operable by the motor and arranged at the opposite side of the said frame to the motor and having connections to operate the groups of ground penetrating means and also having a connection to adjust the sub-frame vertically, and means to fix the sub-frame to the frame to remove strain from the sub-frame adjusting means.

7. In a tractor, the combination of a frame, a sub-frame adjustable vertically on and associated with the frame, ground penetrating means carried by the sub-frame, an axle equipped with ground wheels, an adjustable connection between the sub-frame and the axle, and means carried by the sub-frame and equipped to actuate the ground penetrating means and also equipped to adjust the sub-frame vertically at either end thereof.

8. In a tractor, the combination of a frame, a sub-frame adjustable vertically on and associated with the frame, ground penetrating means carried by the sub-frame, an axle equipped with ground wheels, an adjustable connection between the sub-frame and the axle, and means carried by the sub-frame and equipped to actuate the ground penetrating means and also equipped to adjust the sub-frame vertically at either end thereof, and means to fix the sub-frame to the frame.

9. The combination in a tractor, of a crank having a shaft portion, a frame carrying the crank, a rocking guide on the upper portion of the frame, rods extending loosely through said guide and having abutments at intermediate points of their length, a head connected to the lower ends of the rods and adapted to carry a ground penetrating implement, bearing sections loosely arranged on the rods and arranged at opposite sides of the shaft portion of the crank, springs interposed between the abutments and one bearing section, springs interposed between the head and the other bearing section, and means to actuate the crank.

10. The combination in a tractor, an axle, ground wheels supporting the same, a vertically adjustable frame, a bearing member connected with the axle and containing a nut, a yoke connected with the frame and having a sleeve movable vertically and rectilinearly in the bearing member, and a screw bearing in the yoke and extending through and engaging the nut of the bearing member, whereby when the screw is rotated the yoke and the frame will be vertically adjusted.

11. The combination in a tractor, of an axle, ground wheels supporting the same, a vertically adjustable frame, a bearing member connected with the axle and containing a nut, a yoke connected with the frame and having a sleeve movable vertically and rectilinearly in the bearing member, and a screw bearing in the yoke and engaging the nut; the connection of the yoke to the frame being a detachable connection.

12. The combination in a tractor, of an axle, ground wheels supporting the same, a vertically adjustable frame, a bearing member connected with the axle and containing a nut, a yoke connected with the frame and having a sleeve movable vertically and rectilinearly in the bearing member, and a screw bearing in the yoke and engaging the nut; the connection of the yoke to the frame being a detachable one, actuating means carried by the frame, and a driving connection between the actuating means and the ground wheels and including a shaft detachable from the wheels and adapted when the yoke is disassociated from the frame to be connected with the working parts of a machine to which the frame is connected.

13. A tractor comprising a frame, driving wheels complementary thereto, a vertically adjustable sub-frame associated with the frame, ground penetrating means carried by the sub-frame, means to adjust the sub-frame vertically on the frame, a motor on the sub-frame, and a transmission gearing on the sub-frame and associated with the motor and having a connection to drive the ground penetrating means, a connection to drive the ground wheels, and a connection to drive the sub-frame adjusting means.

14. The combination in a tractor of wheel supporting and spring cushioned bars, a vertically adjustable sub-frame, means to adjust the sub-frame vertically with respect to the said cushioned frame bars, and means whereby the sub-frame may be detachably fixed to the cushioned frame bars to remove strain from the said vertically adjusting means.

In testimony whereof I affix my signature.

LOU M. GARDINER.